Oct. 26, 1954  P. BRIERLEY  2,692,485
RESILIENT COUPLING AND COUPLING UNIT THEREFOR
Filed April 24, 1951  2 Sheets-Sheet 1
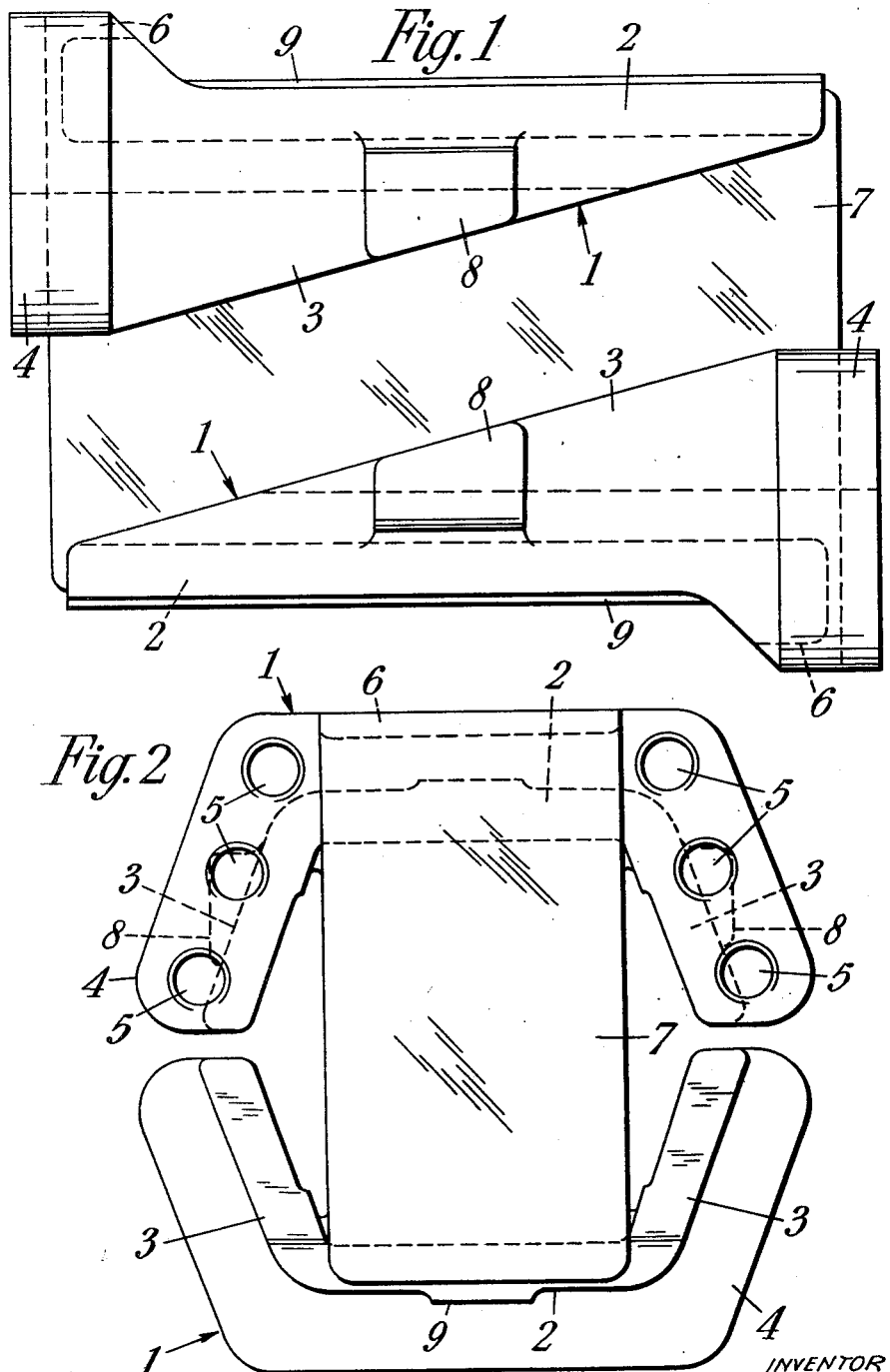

Patented Oct. 26, 1954

2,692,485

UNITED STATES PATENT OFFICE 2,692,485

RESILIENT COUPLING AND COUPLING UNIT THEREFOR

Paul Brierley, Birmingham, England, assignor to Dunlop Rubber Company Limited, London County, England, a British company Application April 24, 1951, Serial No. 222,561

5 Claims. (Cl. 64—14)

This invention relates to resilient couplings and to coupling units therefor which comprises a pair of metal plates or the like connected by a rubber element.

It is an object of the present invention to provide couplings capable of transmitting a high torque in relation to their size as compared with known couplings.

A further object of the invention is to provide compact coupling units by means of which coupling of different torque capacities can be constructed merely by varying the number and arrangement of the units employed.

According to the invention a resilient coupling unit comprises a pair of metal members of channel section spaced apart with a rubber member disposed within the channels and bonded to the base of each channel, means being provided at opposite ends of the metal members for securing each metal member to a coupling flange.

Preferably the channel depth of each metal member is tapered, the sides of the channel being approximately triangular in shape, and each metal member has flanges integral with the sides at the deeper end for securing it to a coupling flange.

According to the invention also, a resilient coupling comprises a pair of coupling flanges connected by a plurality of resilient coupling units, each unit comprising a pair of metal members of channel section, one member of each pair being detachably secured to one flange and the other member similarly secured to the other coupling flange and a rubber member disposed within the channels and engaging the base of each channel.

The invention will now be more particularly described with reference to the accompanying drawings in which:

Figure 1 is a front elevation of one embodiment of a coupling unit according to the invention.

Figure 2 is an end elevation of the coupling unit shown in Figure 1 and

Figure 3:
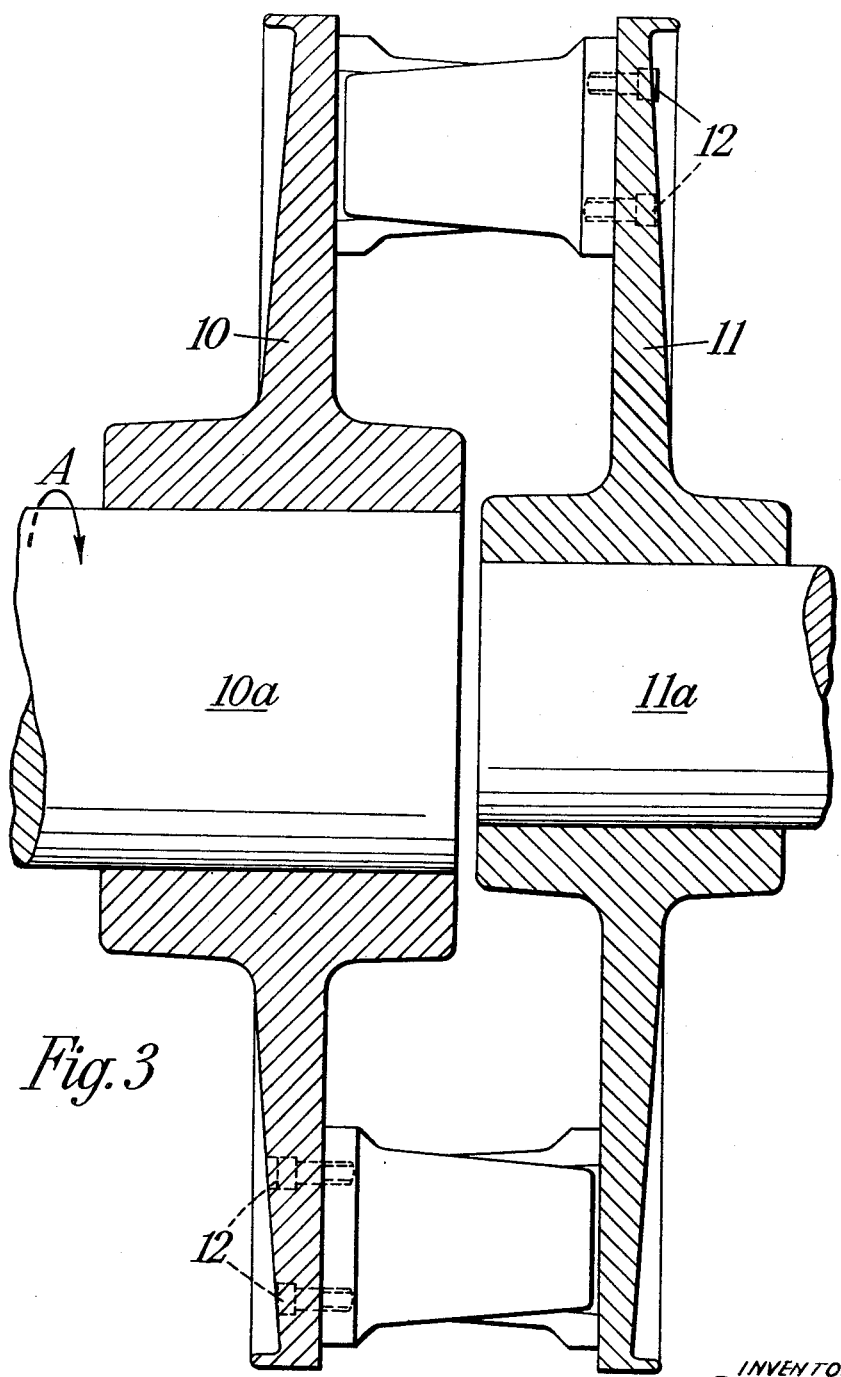
Figure 3 is an incomplete sectional elevation of a torque transmission coupling according to the invention comprising coupling units of the type shown in Figures 1 and 2.

The coupling unit, as shown in Figures 1 and 2 comprises a pair of forged steel channel section members 1. Each channel member has a substantially rectangular base 2 with two tapered sides 3 at the longitudinal edges, each side being set at an angle of about 110° to the base. The sides of the channel member are substantially triangular to provide a channel varying in depth from a maximum at one end to zero at the other end.

The transverse face at the deeper end of each channel member is enlarged in area by a flange 4 extending outwardly at right angles to each side and to the base to allow provision of six tapped holes 5 normal to the transverse face. A slot 6 is cut into the transverse face of the flange and extends through the flange at the edge remote from the channel.

The pair of channel members are spaced apart as shown in Figures 1 and 2 with the deep end of each opposed to the shallow end of the other and they are connected by a rubber member 7 of substantially rectangular cross-section and of substantially the same length as the channel members. The rubber member is moulded between the sides of the channel members and is bonded to the bases thereof and extends into the slot 6 as shown in the drawings.

To facilitate location of the channel members in a mould for moulding the rubber member therebetween, each channel member forging is furnished with a pair of lugs 8, one on the outer face of each side 3 approximately midway between the ends of the channel member, and a rib 9 running longitudinally along the centre of the base. The lugs and the rib are machined to provide location surfaces on the channel member.

The invention will now be further described with reference to a torque transmission coupling illustrated in Figure 3 of the accompanying drawings. The coupling comprises a coupling flange 10 shown in position on a driving shaft 10A to which it is keyed, and a coupling flange 11 shown mounted on a coaxial driven shaft 11A to which it is keyed. The coupling flanges are connected by a number of coupling units two only of which are shown, equally spaced on a pitch circle centred on the common axis of the flanges. The coupling units are secured to the flanges by socket-headed bolts 12 passing through plain holes in the flanges and engaging the tapped holes 5 in the channel members. The coupling units are disposed with the axis of each rubber member which extends through the bases of the attached channel members arranged tangentially to a circle centred on the axis of rotation of the coupling and so that each channel member attached to the driving flange 10 tends to move towards the other channel member of a coupling unit during rotation, i. e. the rubber members are subject to compression during torque transmission. The direction of rotation of the driving shaft 10A is shown by the arrow A in Figure 3, and the rubber members will obviously be compressed to transmit torque in this direction.

Deformation of the rubber members during torque transmission is controlled to some extent by the support of the sides of the channel members which provide a considerable proportion of the resistance of the channel members to deflection under load. The sides also limit the radial deformation of the rubber members caused by centrifugal force.

When bonded coupling units are fixed between coupling flanges to produce compression in the rubber members during torque transmission in the direction of the main drive, a comparatively low reverse torque may be transmitted quite safely with the rubber members in tension. Preferably, however, the coupling units are mounted so that they operate under compression whichever way the coupling rotates. This can be effected by mounting some of the units in an unstressed state between the flanges, twisting one flange relative to the other so as to compress the rubber members, mounting the other units in an unstressed state and then allowing the flanges to attain their equilibrium position, in which some of the compression in the units first mounted is relieved at the expense of compression produced in the other units.

The coupling units may be mounted at a close pitch so that extension of each rubber member during reverse drive is limited or even prevented by the drive being taken through compression of the rubber in the base of each slot 6 under pressure from the adjacent locating rib 9 on the next coupling unit.

In an alternative embodiment of the invention the coupling units are mounted between the flanges so that rubber members are subject to shear stress when the coupling is operating. In this coupling the coupling units are disposed between the flanges and equally spaced on a pitch circle concentric with the axis of rotation of the coupling so that the axis of each rubber member passing through the bases of the attached channel members is radial to the axis of the coupling.

When the coupling is used to transmit torque the sides reinforce the channel members to resist deflection due to centrifugal force. Moreover, the sides of the channel in each coupling unit so confine the rubber member as to enable it to transmit forces from one metal member to the other irrespective of any bond between rubber and metal.

In couplings in which the rubber operates in shear, each coupling unit is preferably fixed between the coupling flanges with the rubber in a pre-compressed condition. The lugs on the sides of the metal members may be utilised to facilitate this object, by using them to locate a clamp for drawing the metal members together until it is possible to secure the coupling unit between coupling flanges in which the fixing holes are disposed to maintain the rubber in compression between the metal members.

Any number of coupling units may be assembled between suitable flanges to form a coupling. When a large number of units is employed they may be arranged on concentric pitch circles centred on the axis of the coupling.

Coupling units according to the invention are exceedingly compact since the sides, which function as strengthening flanges, project on the same side of the base of each metal member as the rubber member and the coupling unit does not spread beyond the limits of the incomplete box-like structure formed by the pair of metal members. This compactness is highly advantageous as it reduces the diameter of coupling flanges required to accommodate the number of coupling units necessary for the transmission of a given torque. Apart from the economic advantage of smaller coupling flanges, centrifugal forces which must be taken into account, particularly at high speeds, are minimised by keeping the diameter of the coupling as small as possible.

What I claim is:

1. A resilient shaft coupling unit comprising a pair of opposed parallel metal members of channel cross-section each widening outwardly from a base toward the opposite member, a rubber stress transmitting member partly in the channel of one member and partly in the channel of the other member and secured at one side to the base of one metal member and secured at the other side to the base of the other metal member, each of said members having a securing flange at the end of the channel the securing flange of one member being in a parallel plane to the plane of the other.

2. The coupling of claim 1 in which the channel of each member decreases in depth at increasing distance from its respective flange.

3. A resilient shaft coupling unit comprising a pair of opposed parallel metal members of channel cross-section each widening outwardly from a base toward the opposite member, a rubber stress transmitting member partly in the channel of one member and partly in the channel of the other member and secured at one side to the base of one metal member and secured at the other side to the base of the other metal member, said metal members each provided with a longitudinal rib on their base portions and a lug in their outer side faces.

4. A resilient shaft coupling comprising a pair of parallel spaced apart coupling flanges connected by a plurality of resilient coupling units, each unit comprising a pair of opposed parallel metal members of outwardly widening channel section, means for securing one member of each pair to one of the coupling flanges and the other member of said pair of members to the other flange such that a base portion of each member projects axially from a flange and a rubber member between the metal members having a pair of parallel flat faces each bonded to the interior face of the base portion of one of the metal members, each of said metal members being provided with a longitudinal rib on its base portion and a lug on its outer side face.

5. A resilient shaft coupling according to claim 4 wherein a portion of the rubber member of each unit extends through the bases of the channel sections for engagement with the longitudinal ribs on the bases of the channel sections of the adjoining units.

References Cited in the file of this patent

UNITED STATES PATENTS

| Number | Name | Date |
|---|---|---|
| 2,049,374 | Harter | July 28, 1936 |
| 2,122,838 | Guy | July 5, 1938 |

FOREIGN PATENTS

| Number | Country | Date |
|---|---|---|
| 551,342 | Great Britain | 1943 |